(12) United States Patent
Jenkins

(10) Patent No.: US 10,648,430 B2
(45) Date of Patent: May 12, 2020

(54) APPARATUS, SYSTEM, AND METHOD FOR VAPORIZING FUEL MIXTURE

(76) Inventor: Walter P. Jenkins, Anna Maria, FL (US)

( * ) Notice: Subject to any disclaimer, the term of this patent is extended or adjusted under 35 U.S.C. 154(b) by 0 days.

(21) Appl. No.: 13/357,603

(22) Filed: Jan. 24, 2012

(65) Prior Publication Data

US 2012/0186557 A1  Jul. 26, 2012

Related U.S. Application Data

(60) Provisional application No. 61/435,613, filed on Jan. 24, 2011, provisional application No. 61/435,618, filed on Jan. 24, 2011.

(51) Int. Cl.
*F02M 25/022* (2006.01)
*F02M 27/08* (2006.01)
(Continued)

(52) U.S. Cl.
CPC ........ *F02M 25/0228* (2013.01); *F02M 27/04* (2013.01); *F02M 27/08* (2013.01);
(Continued)

(58) Field of Classification Search
CPC ..... F02D 41/0002; F02D 41/18; F02M 21/02; F02M 21/04; F02M 25/022;
(Continued)

(56) References Cited

U.S. PATENT DOCUMENTS 1,373,720 A * 4/1921 Gish .................... B01D 35/005
                                                  210/112
2,681,212 A * 6/1954 Fenley .................... F02M 1/00
                                                  123/25 R
(Continued)

FOREIGN PATENT DOCUMENTS

CA          1234026    *  3/1988
CA          1234026 A  *  3/1988  .............. F02B 47/02
(Continued)

OTHER PUBLICATIONS

"Hydrogen Fuel Enhancement", Academic Dictionaries and Encyclopedias, Known about as early as Oct. 2010.
(Continued)

*Primary Examiner* — Mahmoud Gimie
*Assistant Examiner* — Joshua Campbell
(74) *Attorney, Agent, or Firm* — Kunzler Bean & Adamson

(57) ABSTRACT

An apparatus, system, and method are disclosed for vaporizing fuel. A method for vaporizing fuel includes providing a fuel vaporizer. The fuel vaporizer includes a chamber for receiving a liquid, the chamber comprising at least one inlet and at least one outlet. The fuel vaporizer also includes a driver module coupled with the chamber, and a oscillator disposed within the chamber and configured to be driven by the driver module. The method includes feeding water through an inlet of the at least one inlet into the chamber. The method includes driving the oscillator using the driver module at a predetermined frequency, wherein a mist is created from the liquid. The method also includes introducing the mist from the chamber via an outlet of the at least one outlet into an intake of an internal combustion engine.

20 Claims, 10 Drawing Sheets

(51) Int. Cl.
  *F02M 31/18* (2006.01)
  *F02M 27/04* (2006.01)
  *F02D 41/18* (2006.01)
  *F02M 21/02* (2006.01)
  *F02D 41/00* (2006.01)
  *B01F 3/04* (2006.01)
  *F02M 21/04* (2006.01)

(52) U.S. Cl.
  CPC ........... *F02M 31/18* (2013.01); *B01F 3/0407* (2013.01); *F02D 41/0002* (2013.01); *F02D 41/18* (2013.01); *F02M 21/02* (2013.01); *F02M 21/04* (2013.01); *F02M 25/022* (2013.01); *Y02T 10/121* (2013.01); *Y02T 10/126* (2013.01)

(58) Field of Classification Search
  CPC .... F02M 25/0228; F02M 27/04; F02M 27/08; F02M 31/18; B01F 3/0407; Y02T 10/121; Y02T 10/126
  USPC .......................................... 123/434, 536–539
  See application file for complete search history.

(56) References Cited

U.S. PATENT DOCUMENTS

| | | | |
|---|---|---|---|
| 3,773,305 A * | 11/1973 | Fischer | F02M 17/40 261/72.1 |
| 3,800,533 A | 4/1974 | Zankowski | |
| 3,876,363 A * | 4/1975 | La Haye | F23K 5/12 431/11 |
| 3,980,053 A | 9/1976 | Horvath | |
| 3,980,064 A | 9/1976 | Ariga et al. | |
| 4,023,545 A | 5/1977 | Mosher et al. | |
| 4,043,308 A * | 8/1977 | Cerkanowicz | F01N 3/38 123/143 R |
| 4,085,893 A * | 4/1978 | Durley, III | B05B 17/0623 239/102.2 |
| 4,099,489 A | 7/1978 | Bradley | |
| 4,106,456 A * | 8/1978 | Shinoda | F02D 35/0046 123/434 |
| 4,220,127 A | 9/1980 | Reynolds | |
| 4,227,817 A * | 10/1980 | Gerry | B01F 11/0266 123/25 E |
| 4,253,436 A | 3/1981 | Dudrey | |
| 4,324,209 A * | 4/1982 | Gerry | 123/25 B |
| 4,335,698 A * | 6/1982 | Stephens | 123/537 |
| 4,344,404 A * | 8/1982 | Child | F02M 27/08 123/538 |
| 4,367,698 A | 1/1983 | Skala | |
| 4,368,711 A | 1/1983 | Allen | |
| 4,401,089 A * | 8/1983 | Csaszar | F02M 27/08 123/536 |
| 4,440,155 A | 4/1984 | Allen | |
| 4,463,708 A | 8/1984 | Gerry | |
| 4,508,265 A * | 4/1985 | Jido | B01F 5/0262 239/3 |
| 4,540,123 A * | 9/1985 | Junger | B05B 17/0623 239/102.2 |
| 4,541,367 A * | 9/1985 | Lindberg | F02B 43/08 123/25 F |
| 4,599,459 A * | 7/1986 | Hirose | B01J 19/10 204/157.15 |
| 4,757,787 A * | 7/1988 | Risitano et al. | 123/25 A |
| 5,002,033 A | 3/1991 | Housand | |
| 5,080,080 A | 1/1992 | Melendrez | |
| 5,189,990 A | 3/1993 | Powell | |
| 5,564,402 A * | 10/1996 | Poschl | B01F 11/02 123/590 |
| 5,823,148 A | 10/1998 | Housand | |
| 5,826,548 A | 10/1998 | Richardson, Jr. | |
| 6,014,858 A | 1/2000 | Zankowski | |
| 6,371,090 B1 | 4/2002 | Howell | |
| 7,302,795 B2 | 12/2007 | Vetrovec | |
| 7,413,583 B2 | 8/2008 | Langer et al. | |
| 7,475,656 B2 | 1/2009 | Yatsenko | |
| 7,637,971 B2 | 12/2009 | Wang | |
| 7,721,681 B1 | 5/2010 | Russell, Sr. | |
| 7,762,218 B2 | 7/2010 | Hallenbeck | |
| 7,765,961 B2 | 8/2010 | Rutledge | |
| 7,828,225 B2 * | 11/2010 | Cunningham | F02M 27/02 123/670 |
| 2004/0191583 A1 * | 9/2004 | Kelley | H01M 8/04126 429/413 |
| 2006/0196483 A1 * | 9/2006 | Magyari | 123/538 |
| 2007/0210186 A1 * | 9/2007 | Fenton | A62C 5/002 239/422 |
| 2010/0006663 A1 * | 1/2010 | Linscheidt | F23D 11/345 237/12.3 C |
| 2010/0295565 A1 * | 11/2010 | Drack | G01F 23/243 324/693 |
| 2011/0111311 A1 * | 5/2011 | Sato et al. | 429/413 |

FOREIGN PATENT DOCUMENTS

| | | | | |
|---|---|---|---|---|
| CA | 1234026 A | * | 3/1988 | ............. F02B 47/02 |
| CN | 1096566 A | | 12/1994 | |
| CN | 1135573 | | 11/1996 | |
| CN | 1148665 | | 4/1997 | |
| CN | 1148665 A | * | 4/1997 | |
| DE | 2637857 A | | 9/1977 | |
| EP | 1552879 A1 | | 7/2005 | |
| GB | 424350 A | * | 2/1935 | ............... F02M 5/12 |
| JP | 06001983 A | * | 1/1994 | |
| JP | 10131815 A | | 5/1998 | |
| KR | 1019890002782 | | 7/1989 | |
| KR | 20-0211810 Y1 | | 1/2001 | |
| KR | 1020100105108 | | 9/2010 | |
| WO | WO 0212127 A2 | * | 2/2002 | |
| WO | WO0212127 A2 | * | 2/2002 | |
| WO | WO 2009119106 A1 | * | 10/2009 | |
| WO | 2010071606 A2 | | 6/2010 | |

OTHER PUBLICATIONS

Mike Allen, "Hydrogen Gadgets at SEMA: Cars Still Can't Run on Water", Popular Mechanics, http://www.popularmechanics.com/cars/alternative-fuel/gas-mileage/4336109, Dec. 18, 2009.

Mike Allen, "The Truth About Water-Powered Cars: Mechanic's Diary", Popular Mechanics, http://www.popularmechanics.com/cars/alternative-fuel/gas-mileage/4271579, Jul. 2, 2008.

Mike Allen, Water-Powered Cars: Hydrogen Electrolyzer Mod Can't Up MPGs, Popular Mechanics, http://www.popularmechanics.com/cars/alternative-fuel/gas-mileage/4276846, Mar. 27, 2009.

Mike Allen, Why Water Won't Improve Y our MPG: A PM and Dateline NBC Investigation, Popular Mechanics, http://www.popularmechanics.com/cars/alternative-fuel/gas-mileage/4310717, Mar. 27, 2009.

"Alternative fuels gaining ground with consumers the rubber just hit the road on British Columbia's hydrogen highway.", Canada.com, The Vancouver Sun, Sep. 30, 2008.

"Arvin Meritor to Sell it's Emissions Technologies Group", Green Car Congress, http://www.greencarcongress.com/2007/02/arvinmeritor_to.html/, Feb. 2, 2007.

Xin Dingding, "Beijing takes hald of govt cars off road in green move", Chinadaily.com, http://www.chinadaily.com.cn/olympics/2008-06/24/content_6789234.htm, Jun. 24, 2008.

Danny Bradbury, "US hydrogen researchers target 300 mile range breakthrough", businessGreen, http://www.businessgreen.com/print_article/bg/news/1806954/us-hydrogen-researchers-target-300-mile-range-breakthrough, Aug. 19, 2008.

Rob Cockerill, "Hyddrogen from coal to be explored", Gasworld, http://www.gasworld.com/hydrogen-from-coal-to-be-explored/3148.article, Sep. 26, 2008.

"How to Make a Hydrogen Generator", eHow, http://www.ehow.com/print/how_4873026_hydrogen-generator.html, Mar. 2012.

"Electrocatalyst", Wikipedia, Jun. 25, 2011.

(56) References Cited

OTHER PUBLICATIONS

"Electrolysis of water", Wikipedia, Nov. 20, 2005.
"Electrolyte", Wikipedia, Aug. 2010.
Jared Flesher, "His energy bill is $0.00", The Christian Science Monitor, http://www.csmonitor.com/2007/0315/p12s01-sten.html, Mar. 15, 2007.
GreenChek Technology, Inc., http://www.greenchektech.com/, know about as early as Oct. 2010.
Chris Hansen, "Fast money: Car device seller's scheme unravels", MSN.com, http://www.msnbc.msn.com/id/29899191/#.T5gr1MVLfng, Mar. 29, 2009.
"What is the Hydrogen-Boost Mileage Enhancement System?", Hydrogen Boost, http://www.hydrogen-boost.com, Sep. 2007.
John Davis, "Hydrogen Car Gets Real-World Test at EPA", http://domesticfuel.com/2008/09/15/hydrogen-car-gets-real-world-test-at-epa/, Sep. 15, 2008.
"Hydrogen-Enhanced Combustion Engine Could Improve Gasoline Fuel Economy by 20% to 30%", Green Car Congress, http://www.greencarcongress.com/2005/11/hydrogenenhance.html/, Nov. 5, 2005.
"U.S. Army Awards Quantum Follow-On Contract for Hydrogen Refueler", http://www.hydrogenthusiast.com/2005/11/us-army-awards-quantum-follow-on, Nov. 9, 2005.
"Innovative Hydrogen-Powered Car Created", Science Daily, http://www.sciencedaily.com/releases/2008/09/080912091726.htm, Sep. 12, 2008.
Sam Jaffe, "Mutant Algae is Hydrogen Factory", Wired, http://www.wired.com/science/discoveries/news/2006/02/70273, Feb. 23, 2006.
Kevin, Volcano Yields Ancient Hydrogen Producing Organism, Hydrogen Fuel Cars & Vehicles, Jul. 8, 2008.
B. Kroposki et al., "Electrolysis: Information and Opportunities for Electric Power Utilities", Technical Report for National Renewable Energy Laboratory, Sep. 2006.
Stephen Leahy, "Truckers Choose Hydrogen Power", Wired, http://www.wired.com/cars/energy/news/2005/11/69529, Nov. 15, 2005.
Peter Lyon, "Hydrogen power for next RX-8", Auto Express News, http://www.autoexpress.co.uk/news/autoexpressnews/225900/hydrogen_power_for_next_rx8.html, Aug. 5, 2008.
"Fill up your car . . . at your home hydrogen fuel station", Mail Online, http://www.dailymail.co.uk/sciencetech/article-1033683, Jul. 16, 2008.
Roger Mezger, "HydroGen faces NASDAQ delisting", Cleveland.com, http://blog.cleveland.com/business//print.html, Jul. 15, 2008.
"If you're looking for the Best Hydrogen Generator that you can buy, then you've found it", Mileage Shop, http://mileageshop.com, know about as early as Oct. 2010.
"Mileage Saver", Mileage Shop, http://mileageshop.com, know about as early as Oct. 2010.
Jad Mouawad, "Pumping Hydrogen", The New York Times, http://www.nytimes.com/2008/09/24/business/, Sep. 24, 2008.
Andrea Elyse Messer, "Researchers generate hydrogen without the carbon footprint", EurekAlert, http://www.eurekalert.org/pub_releases/2008-07/ps-rgh071508.php, Jul. 15, 2008.
John Richardson, "Hydrogen car show aims to fuel interest", The Portland Press Herald, Mar. 16, 2010.
Erin Scottberg, "How to Make 4 Alternative Fuels at Home: Goodbye, Big Oil!", Popular Mechanics, http://www.popularmechanics.com/cars/alternative-fuel/4277630, Aug. 12, 2008.
Victoria Talbot, "Hydrogen Comes to Brentwood", WestsideToday.com, http://www.westsidetoday.com/n218/hydrogen-comes-to-brentwood.html, Aug. 4, 2008.
Ozzie Freedom, "Do You Want to Know Right Now How You Can Drive Around Using Water as Fuel and Laugh at Rising Gas Costs, While Reducing Emissions?", Water4Gas.com, http://www.water4gas.com/home.php, Known about as early as Oct. 2010.
Jeff Wise, "The Truth About Hydrogen", Popular Mechanics, http://www.popularmechanics.com/science/energy/next-generation/4199381, Nov. 1, 2006.
David Wood, ""Run Your Car on Water" Scheme Could Leave Consumers All Wet", ConsumerAffairs.com, http://www.consumeraffairs.com/news04/2008/07/water4gas.html, Jul. 17, 2008.
"Looking Out 4 You: Water 4 Gas Fails to Boost Mileage", WYFF4.com, http://www.wyff4.com/Looking-Out-4-You-Water-4-Gas-Fails-to-Boost, Jul. 30, 2008.
PCT/US2012/022453, International Search Report and Written Opinion, dated Aug. 31, 2012.
13357460 Office Action dated Mar. 12, 2014.
13357460 Final Office Action dated Jul. 10, 2014.
Joel Escobedo et al., "Surface Tension Prediction for Liquid Mixtures", AIChE Journal, vol. 44, No. 10, Oct. 1998, pp. 2324-2332.
Supplemental European Search Report, EP12739640, European Patent Office, dated Feb. 6, 2017.

\* cited by examiner

900

Start

902 — Create a water/accelerant mist having particles of about 2 microns or less 904 — Introduce the mist into an intake of an internal combustion engine 906 — Trigger combustion a mixture comprising the mist End

Figure 9

APPARATUS, SYSTEM, AND METHOD FOR VAPORIZING FUEL MIXTURE

CROSS-REFERENCES TO RELATED APPLICATIONS

This application claims the benefit of U.S. Provisional Patent Application No. 61/435,613 entitled "H2G 127 System" and filed on Jan. 24, 2011 for Walt Jenkins and U.S. Provisional Patent Application No. 61/435,618 entitled "Spark Plug Design" and filed on Jan. 24, 2011 for Walt Jenkins, which are incorporated herein by reference.

FIELD

This invention relates to vaporizing a liquid and more particularly relates to vaporizing a liquid for input into an internal combustion engine.

BACKGROUND

Description of the Related Art

Combustion is a chemical process involving a fuel and an oxidant that results in a conversion of chemical species and the production of heat. Generally, internal combustion engines combine substantially stoichiometric ratios of fuel and oxidant within a cylinder and a spark plug ignites the reactants and initiates a combustion process. The exothermic nature of the combustion reaction causes the temperature and pressure within the cylinder to increase, which causes the cylinder to expand by thrusting the piston outward, which in turn generates the power to drive the crank shaft and produce the desired result (accelerate a vehicle, propel lawnmower blades, etc.) The amount of power produced by an internal combustion engine is directly proportional to the completeness of the combustion reaction and the characteristics of the fuel and oxidant.

Although a combustion reaction depends on many different variables, one of the most important factors in an efficient combustion reaction is the ability of the reactants, the fuel molecules and the oxidant molecules, to interact with each other. Therefore, an efficient combustion reaction would involve providing for the fuel molecules to be substantially and evenly dispersed throughout the oxidant molecules, thereby allowing sufficient interactions between the reactants and promoting the combustion reaction. However, most fuels used in internal combustion engines are liquids, such as gasoline, diesel, bio-fuels, and the like, and since combustion occurs in the gas phase, achieving a substantially even dispersion of fuel molecules among oxidant molecules can prove difficult. Due to the vapor pressure of liquids, most liquid fuels have at least a minimum concentration of vapor fuel molecules evaporated at the surface of the liquid, which enables combustion to occur. However, this limited concentration of vapor phase fuel molecules severely limits the initial rate of the combustion reaction.

Conventional systems and methods attempt to remedy this problem by increasing the quantity of gas phase fuel molecules by increasing the temperature of the liquid fuel to increase the vapor pressure. Also, conventional systems and methods involve spraying the liquid fuel into fine mist particles to promote evaporation. Although such systems may be successful at increasing the concentration of vapor molecules available for combustion, the problem still remains that, regardless of the quantity of gas phase reactant molecules, the reaction rate of the combustion process is largely dependent on the ability of the reactant molecules to be evenly mixed prior to combustion.

SUMMARY

From the foregoing discussion, it should be apparent that a need exists for an apparatus, system, and method that evenly mix reactant molecules. Beneficially, such an apparatus, system, and method would create mists having small particle sizes.

The present invention has been developed in response to the present state of the art, and in particular, in response to the problems and needs in the art that have not yet been fully solved by currently available fuel vaporizers. Accordingly, the present invention has been developed to provide an apparatus, system, and method that overcome many or all of the above-discussed shortcomings in the art.

A method for vaporizing fuel includes providing a fuel vaporizer. The fuel vaporizer includes a chamber for receiving a liquid, the chamber comprising at least one inlet and at least one outlet. The fuel vaporizer also includes a driver module coupled with the chamber, and an oscillator disposed within the chamber and configured to be driven by the driver module. The method includes feeding water through an inlet of the at least one inlet into the chamber. The method includes driving the oscillator using the driver module at a predetermined frequency, wherein a mist is created from the liquid. The method also includes introducing the mist from the chamber via an outlet of the at least one outlet into an intake of an internal combustion engine.

An apparatus and system to vaporize a fuel is configured to functionally execute the necessary steps of the above method. The apparatus and system in the disclosed embodiments substantially includes modules and features necessary to carry out the functions presented above with respect to the described method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 illustrates one embodiment of a process for burning a water/accelerant mixture in accordance with the present invention.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, the terms "accelerant" and "fuel" are used interchangeably to indicate any flammable material. Exemplary accelerants or fuels include alcohols, diesel fuel, gasoline, oils, kerosene, jet fuel, AV gas, or the like. Exemplary accelerants may include any liquid from an organic or mineral source which can ignite. In some embodiments, a fuel/accelerant may include a gas. Exemplary gaseous fuels/accelerants may include hydrogen, oxygen, butane, propane, methane, or any other gas which can ignite.

Figure 1:
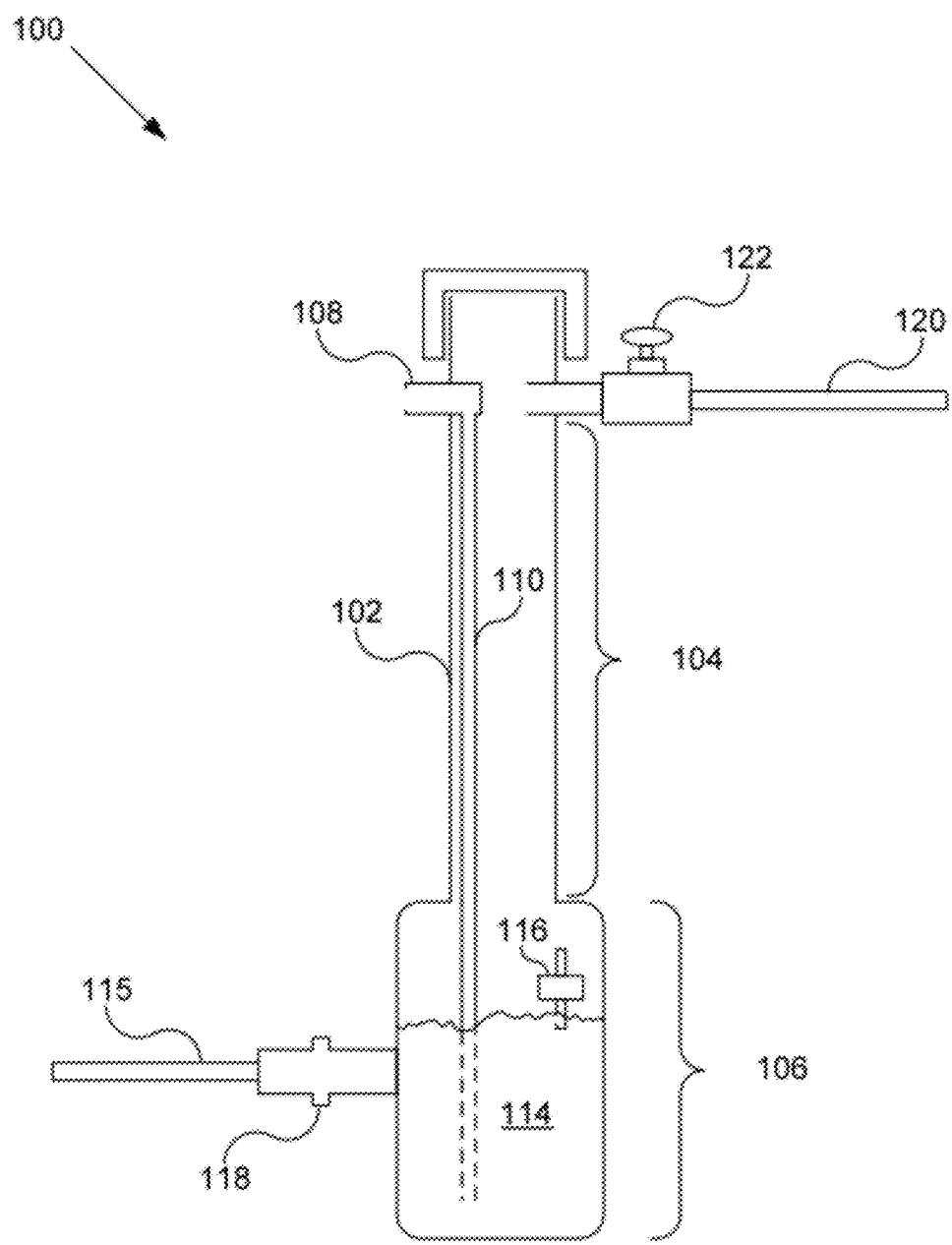
FIG. 1 is a block diagram illustrating a cross-sectional view of a fuel vaporizer in accordance with the present invention.

FIG. 1 is a block diagram illustrating a cross-sectional view of a fuel vaporizer 100. The fuel vaporizer (hereinafter "vaporizer") 100, in one embodiment, is formed of an elongated container comprising a vapor chamber 104 and a liquid chamber 106. The vapor chamber 104 and the liquid chamber 106 are in fluid communication with each other. In other words, a fluid may pass from the liquid chamber 106 to the vapor chamber 104.

The vaporizer 100 also includes multiple fluid inlets and a fluid outlet. As used herein, the term "fluid" refers to a substance that deforms, or flows, under an applied force and conforms to the outline of a container. Additionally, the term "fluid," as used herein, may refer to a liquid phase substance or a gas phase substance. Therefore, the inlets described below may be utilized for the introduction of a gas, liquid, or combination thereof into the vaporizer 100. In one embodiment, the vaporizer 100 includes an air inlet 108 coupled to a tube 110 that extends to an area near the bottom of the vaporizer 100. Although the depicted air inlet 108 is positioned near the top of the vaporizer 100, the air inlet 108 may be positioned differently while still effectively introducing ambient air into the vaporizer 100. An opening 112 in the tube 110 is positioned so that the opening 112 is submerged by a liquid fuel 114. Examples of liquid fuel 114 capable of being used in the vaporizer 100 include, but are not limited to, gasoline, diesel, bio-fuels, kerosene, etc.

The vaporizer 100 also includes a fuel inlet 115 for delivering fuel 114 to the liquid chamber 106 of the vaporizer 100. The fuel inlet 115 couples the vaporizer 100 to a fuel source (not shown), for example, a fuel tank. The vaporizer 100, in one embodiment, includes a float switch 116 that detects the amount of fuel 114 in the vaporizer 100. The float switch 116 communicates the amount of fuel with a valve 118, which in turn meters the amount of fuel 114 that is allowed into the vaporizer 100. At a predetermined fuel level, the float switch 116 indicates to the valve 118 that the liquid chamber 106 is nearly full, and in response the valve 118 closes to stop the flow of fuel 114 into the liquid chamber 106. In an alternative embodiment, the float switch 116 communicates the fuel level with an engine control module (ECM) which subsequently sends a command to the valve 118 indicating that the valve 118 should close.

In another embodiment, the vaporizer 100 includes an outlet or fuel supply line 120 that connects the vaporizer 100 to the intake of a motor. The fuel supply line 120 includes an adjustable valve 122 for adjusting the outlet flow from the vaporizer. The vacuum pressure created by the internal combustion motor draws an air-fuel mixture from the vapor chamber 104 and creates an area of low pressure, which subsequently draws air through the air inlet 108 via the tube 110. As air is drawn into the vapor chamber 104, air bubbles through the fuel 114 and creates a fuel an air mixture of atomized particles.

A second liquid substance may be introduced to the liquid chamber 106 and mixed with the fuel 114. When the motor is in an operating state, vacuum pressure causes such turbulence in the liquid chamber 106 that the fuel 114 and the second liquid substance homogenize into a blended mixture that is then vaporized by the bubbling air from the air inlet 108. Examples of the secondary liquid substance include any type of desirable fuel 114 additive for increasing power, efficiency, or both, of the motor. In a further example, the secondary liquid substance may include water in amounts selected to decrease fuel consumption while still providing a combustible air/fuel/water mixture.

Figure 2:
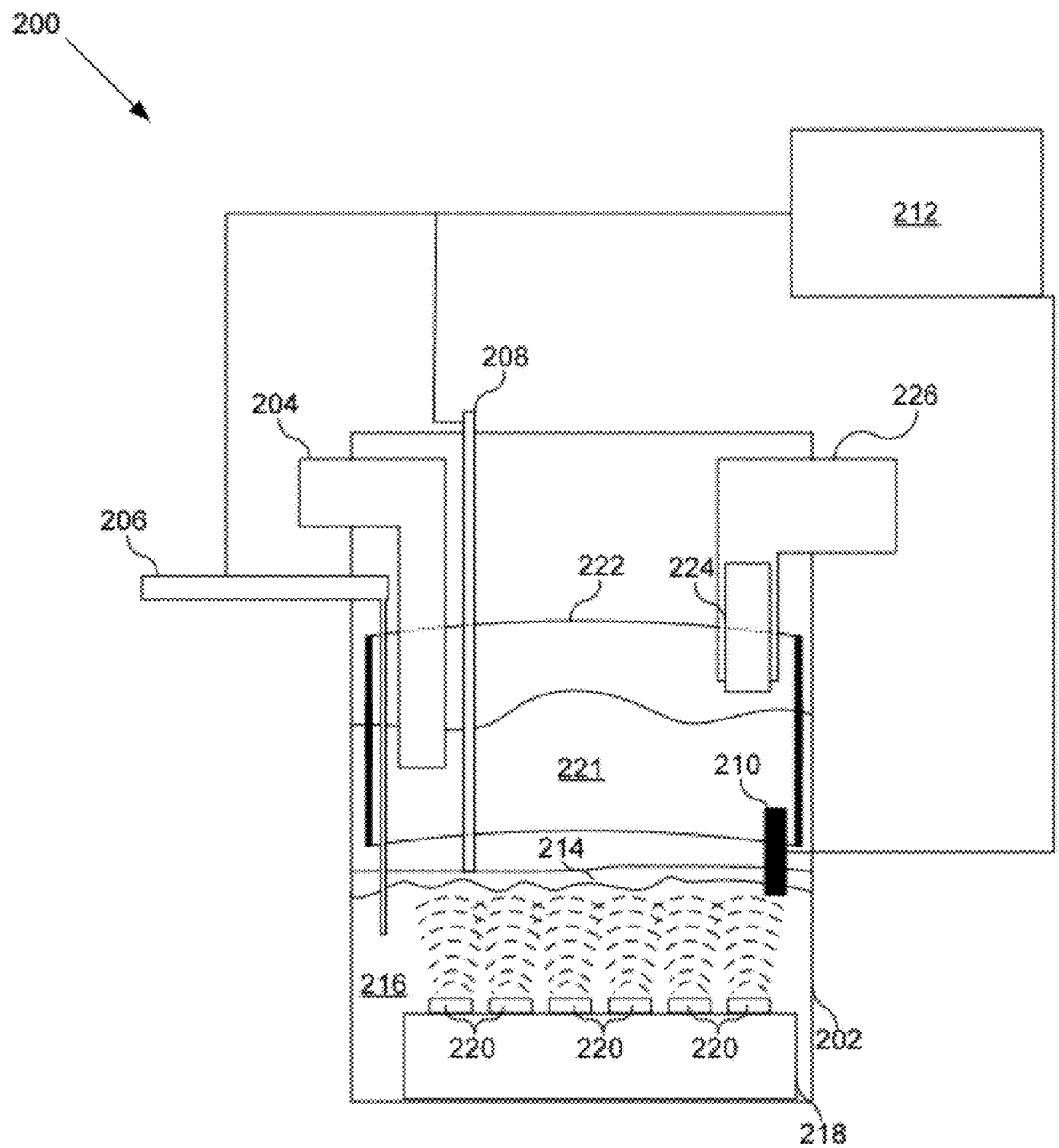
FIG. 2 is a block diagram illustrating a cross sectional view of a hybrid fuel system in accordance with the present invention.

FIG. 2 is a block diagram illustrating a cross sectional view of a hybrid fuel system 200. In one embodiment, the hybrid fuel system (hereinafter "system") 200 includes a container 202 having multiple inlets and an outlet in a manner similar to the vaporizers 100, 200, 300 of FIGS. 1-3, respectively. In particular, the container 202 comprises an air inlet 204, a water inlet 206, and a fuel inlet 208. The positioning of the inlets 204, 206, 208 may be determined according to the environment where the system 200 will be used. In other words, the positioning of the inlets 204, 206, 208 is determined according to convenience.

In one embodiment, the length of the tubes of the inlets 204, 206, 208 into the container is selected according to the size of the container 202 and a desired depth of a water/fuel mixture. The water inlet 206, for example, extends into the container 202 and downward into the water/fuel mixture. In a further embodiment, the water inlet 206 tube extends 3-6 inches below a level controller 210. The air intake 204, conversely, extends from the exterior of the container to a distance of between about 3-6 inches above the level controller 210. The fuel inlet 208, in one example, extends from a fuel source (not shown) into the container 202 and to a depth similar to that of the level controller 210.

The level controller 210 detects the level and composition of the water/fuel mixture and communicates this information with a control module 212. The control module 212 then can maintain the proper ratios of fuel and water within the container 202 by controlling the flow of water through the water inlet 206 and fuel through the fuel inlet 208. This may be accomplished by, for example, controlling respective valves coupled with water and fuel inlets 206, 208. Alternatively, the control module 212 may control pumps to control the flow of water and/or fuel into the container 202. In one embodiment, the control module 212 is a separate element, as depicted, from the level controller 210. In a different embodiment, the control module 212 is integral to the level controller 210 and is positioned inside of the container 202.

The control module 212 maintains the water/fuel mixture at a predetermined level. In the depicted embodiment, a thin layer of fuel 214 floats on water 216, and the ratio of fuel 214 to water 216 is controlled by the level controller 210. In one example, the level controller 210 is a float switch that detects either rising or declining levels of water/flue mixture in the container 202. The level controller 210 then communicates the quantity of water/fuel mixture with the control module 212 as described above. Alternatively, the level controller 210 is an optical sensor, or a conductance sensor.

The ratio of fuel to water can vary considerably. In one embodiment, the mixture can include less than 5% fuel or accelerant. Other embodiments may include 20% or 50% accelerant. Furthermore, the type of fuel/accelerant can also vary. In one embodiment, a liquid state gas or diesel may be mixed with the water. In another embodiment, a gas state hydrogen (H) and/or oxygen (H) may be mixed with the water. In this embodiment, this may create a fuel mixture entirely derived from water. In some embodiments, this mixtures comprises all that is fed into a combustion chamber and as such the combustion chamber may be igniting fuel 100% sourced from water.

The container 202 also includes an oscillator array 218 formed of multiple oscillator discs 220. The oscillator discs 220 are capable of generating high frequency vibrations to disturb, mix, and vaporize the water/fuel mixture 221. One example of an oscillating disc 220 capable of such high frequency vibrations includes, but is not limited to, a piezoelectric material. The piezoelectric material includes naturally occurring crystals and man-made ceramics such as, but not limited to, barium titanate, lead titanate, lead zirconate titanate, etc.

In one embodiment, the piezoelectric material is selected according to an ability to vibrate at a frequency in the range of between about 0.5 to 5.0 MHz. In a further embodiment, the piezoelectric material is selected according to an ability to vibrate at a frequency in the range of between about 1.6 and 3.0 MHZ. In this embodiment, the oscillating discs 220 generate water/fuel particles having an ideal size for combustion. Generally, the higher the frequency of the oscillating discs, the smaller the size of the water/fuel particles. The ideal size particle may depend on various engine parameters including, engine displacement, and combustion technology. In one embodiment, the particle size may be in a range of about 2 microns or less. In one embodiment, the particle size may be in a range of about 1.8 microns or less. In one embodiment, the particle size may be in a range of about 1.6 microns or less. In one embodiment, the particles have a size in a range of about 1.6 and to 1.8 microns (μm). One example of a particle size generated from the oscillating discs 220 is 1.7 μm.

According to one embodiment, the smaller the particle size the better the fuel and/or water mixture will combust. For example, smaller sizes may allow for more complete burning of the water and or accelerant mixture. In one embodiment, particles sizes of about 2 μm or less allow for a fuel to water ratio of about 5% to 95%. Some embodiments include fuel rations of less than 5%.

In one embodiment, the number of oscillating discs 220 is determined according to the cross-sectional area of the container 202. In a tubular container 202, for example, and having a diameter of about 6 inches, an oscillator array 218 may have in the range of between about 3 and 12 oscillator discs 220.

According to one embodiment, a pond fogger may be used as an oscillator array 218. For example, www.mainlandmar.com sells an Ocean Mist Maker™ fogger which may be used as the oscillator array 218, in one embodiment. Other exemplary foggers include those manufactured by Siansonic Technology Ltd of Beijing, China which are available for sale at www.siansonic.com. Other pond foggers, for example those with the above described frequencies may be used in some embodiments. According to one embodiment, an ultrasonic nozzle may be used to vaporize the accelerant and/or water (see FIGS. 7 and 8).

In one embodiment, the container 202 includes a screen liner 222 that conforms to the shape of the container 202. The screen liner 222 is coupled with a power source to either positively or negatively charge the screen liner 222. The screen liner 222 is formed of an electrically conductive material. The screen liner 222 effectively charges the vaporized water/fuel mixture. An oppositely charged screen mesh 224 is coupled to an outlet 226. The outlet 226 is connected with the intake of a motor.

In one embodiment, the screen liner 222 and screen mesh 224 are electrically biased in relation to each other. For example, if the screen liner 222 is positively charged, the screen mesh 224 may be negatively charged. In one embodiment, the electrically biased screen liner 222 and screen mesh 224 induce the vaporized water/fuel particles to align with a magnetic or electrical field. For example, by aligning at least a portion of the molecules with a magnetic or electrical field dispersion of water molecules and fuel molecules among each other may be increased.

Figure 3:
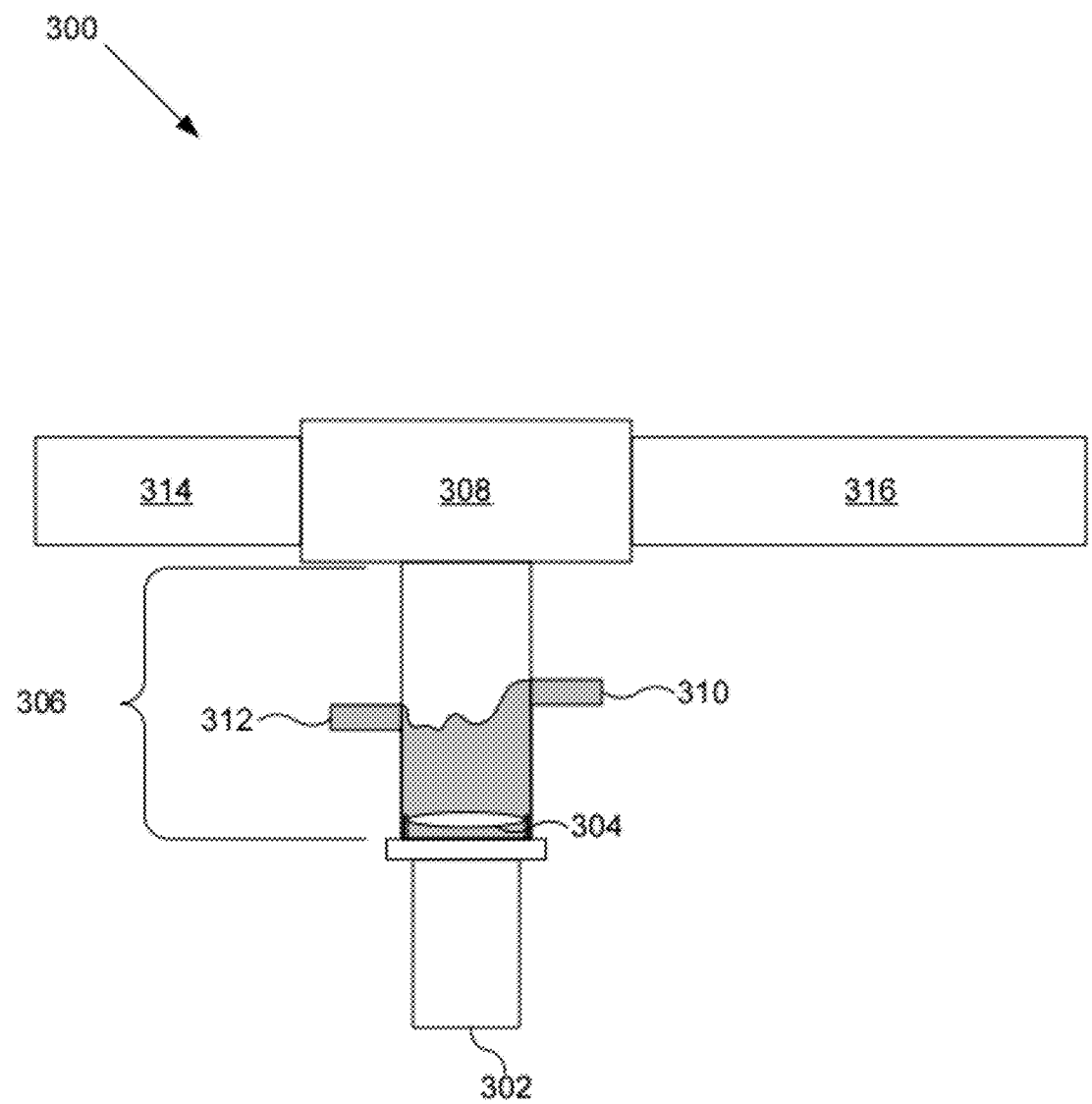
FIG. 3 is a block diagram illustrating an embodiment of a system for atomizing water in a micron particle size mist, in accordance with the present invention.

FIG. 3 is a block diagram illustrating another embodiment of a system 300 for atomizing water in a micron particle size mist. The system 300, in one embodiment includes a driver module 302, a vibrating disc 304, a chamber 306, and a coupler 308. The driver module 302 is configured to provide power to the vibrating disc 304 and control the frequency of the vibrations. In one embodiment, the driver module 302 converts a DC input voltage to an AC output voltage for driving high frequency vibration devices, for example, a piezoelectric disc.

The driver module 302 is tunable to a specific desired frequency. In one embodiment, the desired frequency is in the range of between about 0.5 to 5.0 MHz. In a further embodiment, the desired frequency is in the range of between about 1.6 and 3.0 MHz. In one embodiment, the desired frequency is above 1.6 MHz. The vibration disc 304 is, in one example, a piezoelectric disc formed of a piezoelectric material capable of vibrating with a frequency in the range of between about 0.5 and 5.0 MHz. Examples of materials capable of vibrating with a frequency in the range of between about 0.5 and 5.0 MHz include, but are not limited to, lead-zirconate titanate, lead titanate, barium titanate, sodium tungstate, etc.

The frequency is selected according to a desired mist or vapor particle size. The vibrating disc 304 vibrates and agitates the liquid 305 to generate a mist or vapor that travels upwards towards the coupler 308. In other words, the vibrating frequency of the vibration disc 304 correlates to the particle size of the mist, with higher vibrations resulting in a smaller particle size. In one embodiment, a desired particle size is in the range of between about 0.5 and 4.5 microns. In another embodiment, a desired particle size is in the range of between about 1.2 and 2.2 microns. In yet another embodiment, the desired particle size is about 1.7 microns.

The vibration disc 304 is disposed inside of the chamber 306 which is coupled to the driver module 302. In one embodiment, the driver module 302 is a pulse generator that provides an electrical bias across the vibration disc 304. The chamber 306, in one embodiment, is formed with an inlet port 310 and an outlet port 312. The inlet port 310 is fluidly coupled with a liquid source, for example, a water tank. The outlet port 312 is also fluidly coupled with the liquid source such that water is circulated from the liquid source to the chamber 306 and back to the liquid source.

The coupler 308 connects an air intake 314 with the chamber 306. The air intake 314 is a conduit for air that is being drawn into a motor. In a naturally aspirated motor, the air is drawn in as part of the cycle of the motor. In a turbo-charged or supercharged motor, air is forced into the motor. In either situation, the air intake of the motor passes through the coupler 308 and draws the mist created by the vibrating disc into the flow of air. The air/mist mixture flows through a conduit 316 towards the motor, as will be described below in greater detail.

Figure 4:
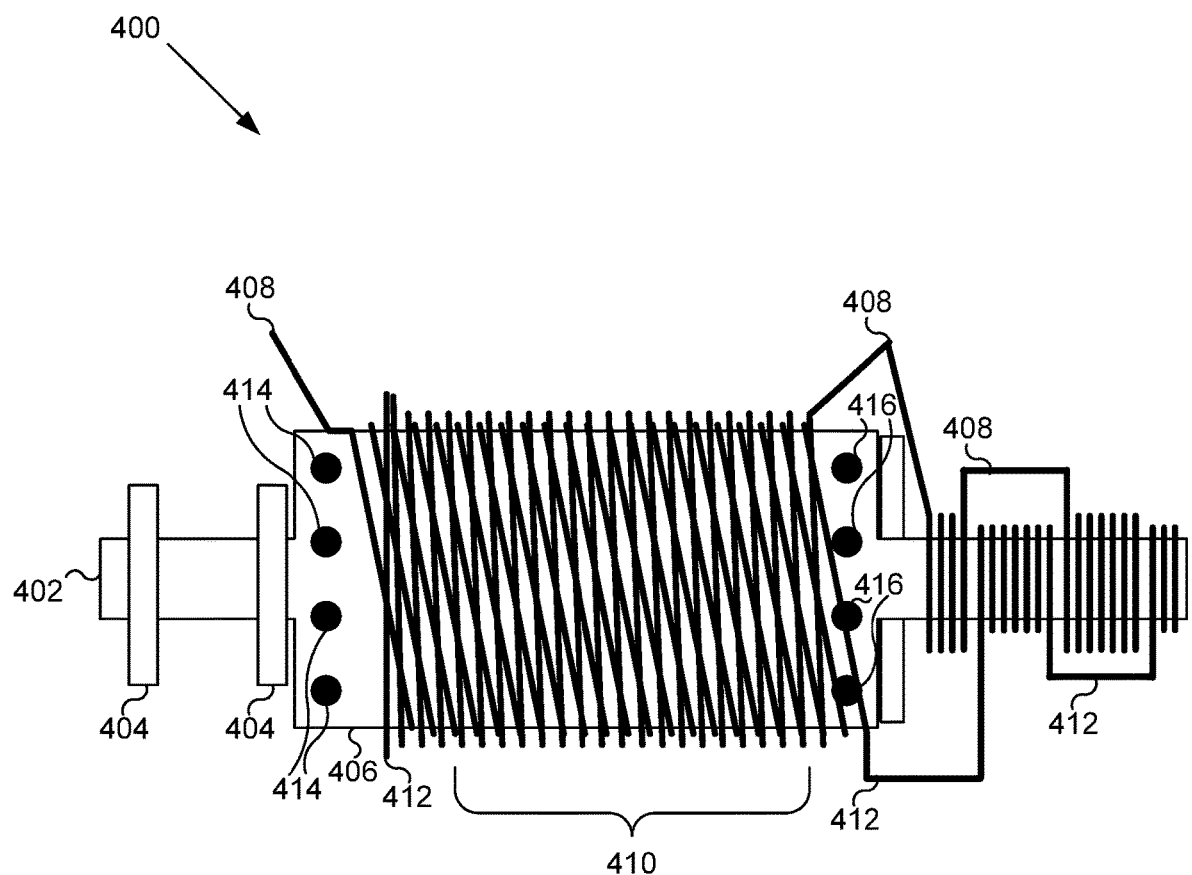
FIG. 4 is a schematic block diagram illustrating one embodiment of a device 400 for the hydrolysis of water in accordance with the present invention.

FIG. 4 is a schematic block diagram illustrating one embodiment of a device 400 for the hydrolysis of water. The device 400 works together with the system 300 of FIG. 3 to extract hydrogen and oxygen from water. The outlet conduit 316 of the system 300 of FIG. 3 forms the intake 402 of the device 400, and as such, the device 400 functions to hydrolyze the water mist formed from the vibration disc 304 of FIG. 3. The device 400 includes ring magnets 404, a reaction chamber 406, a plurality of coils referred to as coil A 408, coil B 410, and coil C 412, transducers 414, and a ring of LEDs 416.

The ring magnets 404 first act on the entering mist to align the electronic fields of the particles in the mist. The ring magnets 404, in one embodiment, are neodymium circular magnets and each magnet is oriented with the poles in the same direction. For example, both ring magnets 404 may have their north poles directed towards the reaction chamber 406. The ring magnets 404 may be spaced approximately one inch apart, and as depicted, positioned on the intake conduit 402.

In one embodiment, the reaction chamber has a diameter in the range of between about 2 and 6 inches. In another embodiment, the reaction chamber 406 has a diameter of about 4 inches. The length of the reaction chamber 406, in one example, is in the range of between about 6 and 8 inches. The reaction chamber 406 may be formed of a rigid material, including, but not limited to, polyvinyl chloride (PVC). The reaction chamber 406 is fluidly coupled with the intake conduit 402 such that the mist flows through the intake 402 into the reaction chamber 406.

The plurality of coils 408, 410, 412 wrap around an exterior surface of the reaction chamber 406 and are wound in opposing directions. Each of the coils 408, 410, 412 is wound to a length selected to resonate in a harmonic frequency to each other. The polarity of coil A 408 and coil C 412 may be opposite to each other. In a further embodiment, coil B 410 is a closed loop coil. In other words, coil B 410 is not a driven coil, but rather picks up sympathetic energy from coil A 408 and coil B 412 by induction.

Coils A and C, in one embodiment, are driven by first and second pulse width modulators capable of 50 amps. The alignment of the particles of the mist is acted on by the alternating fields of DC current generated by the plurality of coils A, B, C. This is due to coils A and C being driven at opposite polarity and 180 degrees out of phase, and the center coil B being wound to sympathetically resonate at the harmonics of coils A and C in alternating timing. Coils A 408 and C 412 may also wrap around an outlet conduit 420 to further affect the particles of the mist.

Transducers 414 introduce specific frequencies to the water mist as the mist flows into and out of the reaction chamber 406. In one example, the frequencies are in the range of about 6010 Hz. Additionally, the transducers 414 may introduce frequencies in the mist that cause light and sound frequencies to interact much more coherently. One example of such a frequency is 1.094 MHz.

The ring of LEDs 416 is configured to shine light into the reaction chamber 406 to affect the mist. The LEDs are configured to emit light in both the wide band UV and infrared spectrums. In a further embodiment, the ring of LEDs includes individual LEDs configured to emit light at specific narrow frequencies in both UV, far UV, and infrared spectrums. The ring of LEDs 416 may be powered by either of the coil A or coil C, or alternatively, by a separate power circuit.

The infrared and UV frequencies have been shown to affect or enhance the separating of covalent bonds in a water molecule. However, these frequencies alone are acting only on the narrow range within a dynamic curve of their resonance and particle interactions of the target medium, or liquid in this case, water. It is known that the dynamic nature of reactions in separating water into hydrogen and oxygen are not confined to a narrow band reaction, but instead present a moving target of maximum reaction within a dynamically changing zone of frequencies. Therefore, the components described above with reference to FIG. 4 function together to present multiple targeted frequencies that break the covalent bods of hydrogen and oxygen in the water molecule.

The affect achieved is the protonation and or proton spin of the water particles. While some water particles are separated into hydrogen and oxygen, others that do not separate are preconditioned to do so when acted on by electrical or heat changes such as the heat and spark inside of an internal combustion engine cylinder. To better achieve this, a spark plug having a higher voltage in the range of between about 150,000 and 200,000 volts may be used. Additionally, the spark timing may be widened to drive the spark throughout a down stroke of each cylinder by repeated firing of the spark plug until a piston has moved to bottom dead center.

Figure 5:
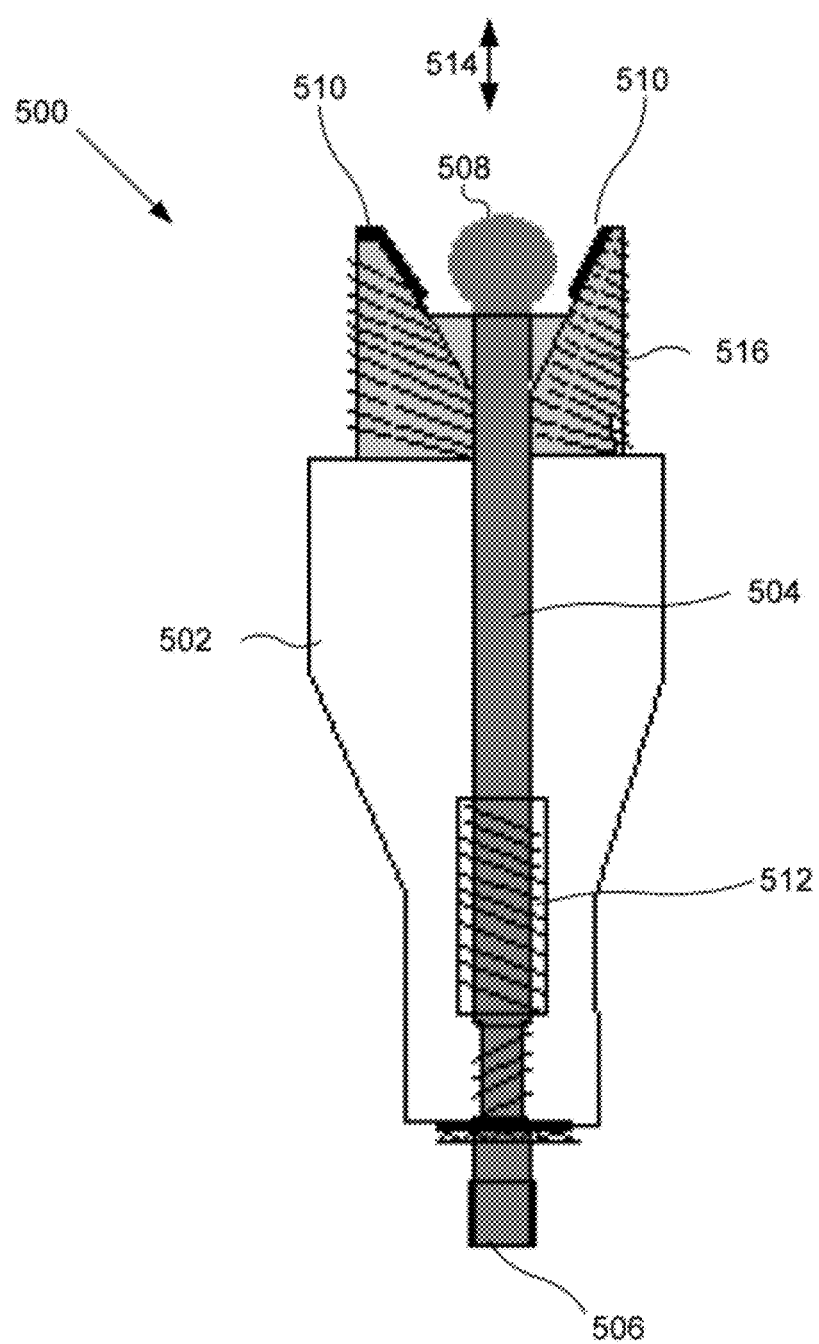
FIG. 5 is a schematic block diagram illustrating one embodiment of a spark plug in accordance with the present invention.

FIG. 5 is a schematic block diagram illustrating one embodiment of a spark plug 500 which may be used in an internal combustion engine. According to one embodiment, the spark plug shown is a unique type of plug which employs design and shape principles to enhance its use in internal combustion engines. The spark plug 200 includes an insulating ceramic casing 502, a conducting rod 504 running between a cap connector 506 and a spherical electrode 508, and a conical electrode 510.

The spherical electrode 508 is position near a conical electrode 510. The spherical electrode 508 includes a portion that is substantially spherical. In one embodiment, the spherical electrode 508 may be made of any conductive material. In one embodiment, the spherical electrode is made at least partially of platinum. This spherical design is chosen by following Nikola Tesla's principles that a sphere retains its charge longer than sharp edged shapes which tend to leak current form the sharpest point. Typical spark plugs employ a rod with a cut off flat end leaving a ring shaped sharp edge. The spherical electrode e508 laces sharp points and thus better retains its charge. Thus, the spherical electrode 508 may maintain a charge until a maximum amount of charge is built up with minimal leakage. This may result in a larger or more substantial spark which leads to a greater combustion of fuel and/or water within a combustion chamber.

A spark may be formed between the spherical electrode 508 and the conical electrode 510 by electrically biasing electrodes 508, 510 in relation to each other. In one embodiment, a spark may be formed by electricity arcing between the spherical electrode and the conical electrode 510. Similar to the spherical electrode 508 the conical electrode 510 may be formed of any conductive material. In one embodiment, the conical electrode 510 is formed of platinum. In one embodiment, the conical electrode 510 has an interior surface that has a frustro-conical shape. In one embodiment, the interior surface of the conical electrode 510 is at 45 degrees. In one embodiment, the conical electrode 510 does not extend below the bottom of the spherical electrode 508. This may ensure that a spark will not arc below the spherical electrode 508 and the conical electrode 510 or that a short between the conical electrode 510 and the conducting rod 504 or spherical electrode 508 is formed.

In one embodiment, a portion of the conducting rod 504 connected to the conducting cap 506 is threaded with respect to a portion of the conducing rod 504 connected to the spherical electrode 508. In one embodiment, the threaded aspect of the design combined with the conical shape of the conical electrode 510 allows for the spherical electrode 508 to be adjusted closer or farther from the ground cone by turning the cap connector 506. In one embodiment, the threaded tube insert or casting through which treaded center conductor is adjusted by turning.

Figure 6:
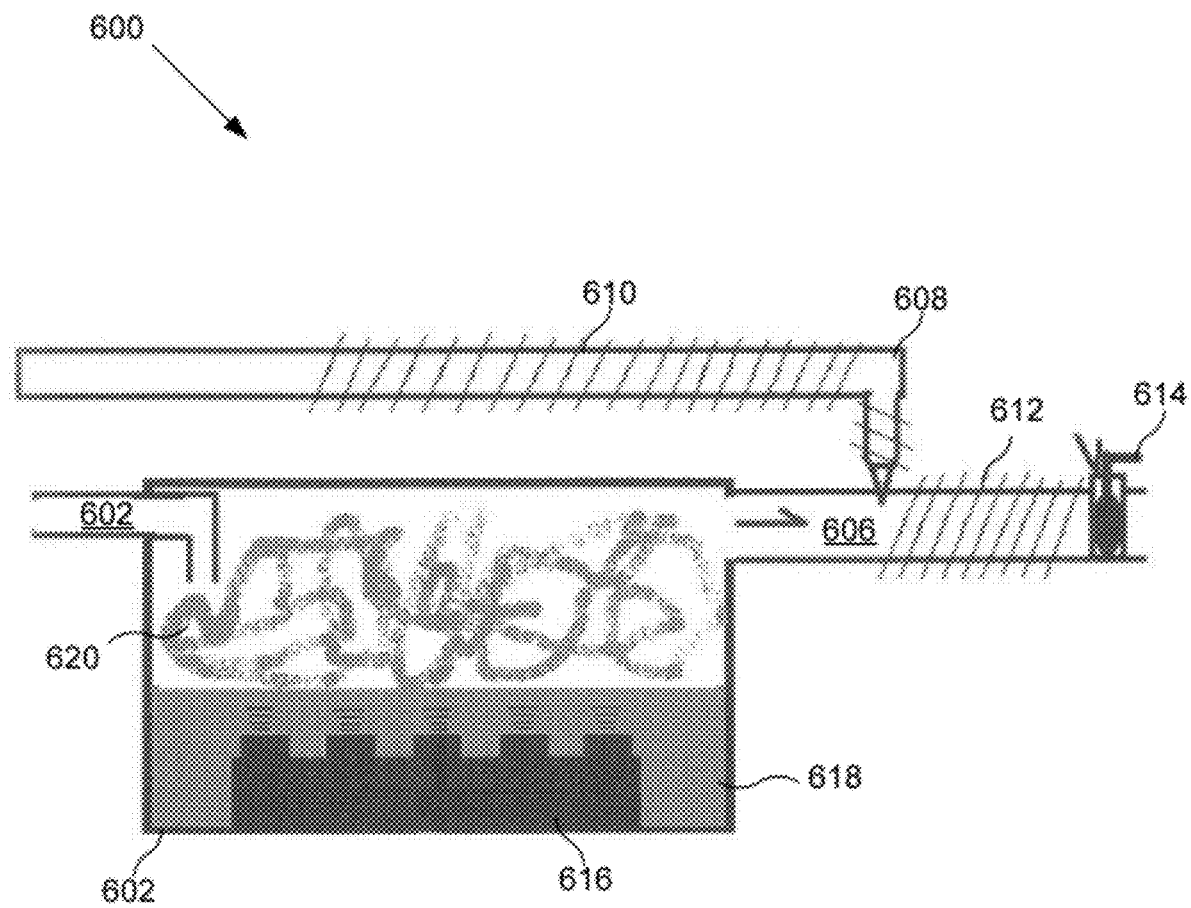
FIG. 6 is a block diagram illustrating a cross sectional view of another embodiment of a hybrid fuel system in accordance with the present invention.

FIG. 6 is a block diagram illustrating a cross sectional view of another embodiment of a hybrid fuel system 600, similar to the hybrid fuel system 200 of FIG. 2. The system 600 illustrates that the fuel may be inserted water is vaporizing in a vaporization chamber. Some portions of the system 600 have been left for simplicity. The hybrid fuel system 600 includes a container 602 air inlet 604, an air outlet 606, a water inlet (not shown), and a fuel inlet 608. A fuel polarizer 610 is shown on the fuel inlet 608 and a water polarizer 612 is shown on the air outlet 606. A valve 614 is shown on the air outlet 614. An oscillator array 616 is shown within the container 602 in a quantity of water 618.

Similar to the embodiment of FIG. 2, the oscillator array 616 may oscillate to create a mist or vapor 620 within a chamber of the container 602. As air is drawn through the container 602, via the air inlet 602 and air outlet 606, some of the mist 620 is carried along.

In the depicted embodiment, fuel is inserted after the chamber of the container 602. More specifically, the fuel may be inserted through the fuel inlet 608 after the air outlet 606. In one embodiment, it may be easier to get a dispersed mist or vapor of fuel than of water.

The fuel polarizer 610 and the water polarizer 612 are coils through which an electrical current or signal may be induced. A current or signal through the coils may then induce an electric or magnetic field within the respective air outlet 606 and fuel inlet 608. In one embodiment, the fuel polarizer 610 is used to polarize incoming fuel in one orientation while the water polarizer 612 may be used to polarize incoming fuel in an opposite orientation. According to one embodiment, this may lead to electromagnetic polarity bonding and may facilitate mixing of the water vapor or mist with the fuel.

In one embodiment, the fuel and water may be oppositely polarized by inducing opposite currents, out of phase signals, or reversing the coil wiring between the two polarizers 610, 612. For example, the coils of the polarizers 610, 612 may be driven similar to coil A 408 and coil C 412 of FIG. 4. Although the coils are not surrounding the cams chamber as in FIG. 4, the same driving of the coils may be used. Furthermore, the number of turns may be varied or modified to obtain a desired polarization of strength of polarization. According to one embodiment, the polarizers 610, 612 may be driven at a frequency corresponding to the frequency of the oscillators in the oscillator array or in a nozzle. For example, the polarizers 610, 612 may be driven at substantially the same frequency or at a harmonic of the same frequency. For example, if a piezoelectric oscillator is driven at 1.6 MHz the coils of the polarizers 610, 612 may be driven at 0.8, 1.6, or 3.2 MHz or any other integer multiplier or divisor of 1.6.

Although the water polarizer 612 is shown after the location where fuel would be inserted by the fuel inlet 608, the water polarizer 612 may also be located prior to the location of the fuel inlet 608.

Figure 7A:
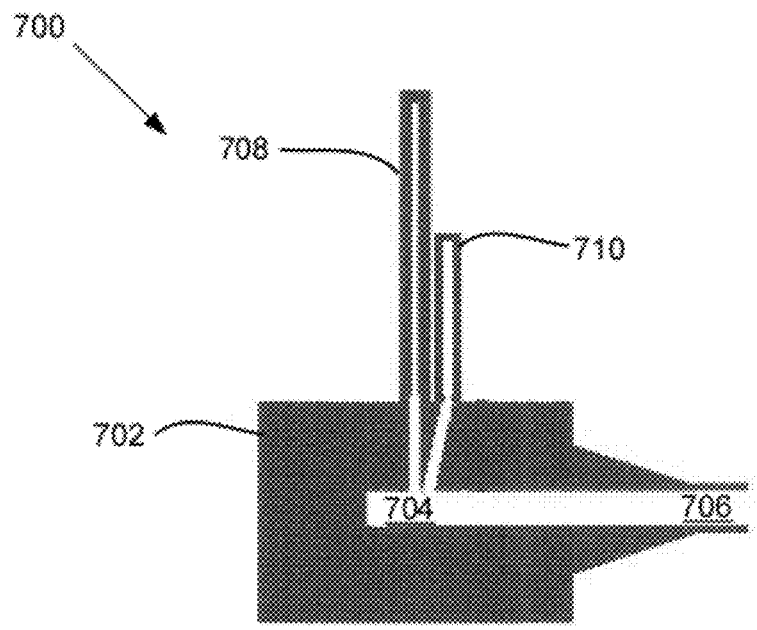
FIGS. 7A and 7B illustrate an exemplary embodiment of a nozzle that may be used in a hybrid fuel system in accordance with the present invention.
Figure 7B:
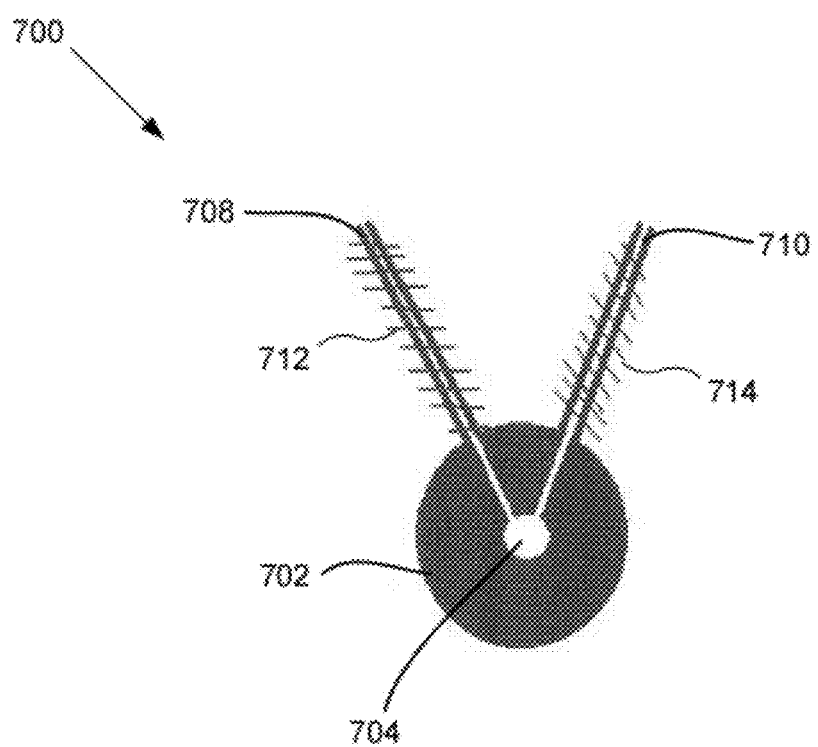

FIGS. 7A and 7B illustrate an exemplary embodiment of a nozzle 700 that may be used in a hybrid fuel system. For example, rather than using the containers 202, 602 and oscillator arrays the nozzle 700 may be used to vaporize liquids such as water and an accelerant. FIG. 7A illustrates a cross-sectional side view of one embodiment of a nozzle 700 used for mixing and vaporizing two liquids. FIG. 7B illustrates a cross-sectional top view of the nozzle 700 of FIG. 7A.

The nozzle 700 includes a nozzle body 702, a nozzle chamber 704, and a nozzle outlet 706. In one embodiment, the nozzle chamber 704 may contain one or more piezo electric oscillators (such as the oscillator of FIG. 3) for vaporizing a liquid. In one embodiment, the nozzle body 702 may include a driver module for driving an oscillator within the nozzle chamber 704. According to one embodiment, liquid introduced into the nozzle chamber 704 may be quickly vaporized by an oscillator within the chamber 704 which may increase pressure and cause the vapor or mist to be forced through the nozzle outlet 706. In one embodiment, the nozzle 700 is capable of much higher throughput of liquid than a pond fogger or an oscillator array. As such, it may be desirable to use a nozzle 700 in large internal combustion engines.

The nozzle 700 includes a water inlet 708 and a fuel inlet 710. In one embodiment, water is introduced into the chamber 704 via the water inlet 708 while a fuel or accelerant is introduced to the chamber via the fuel inlet 710. The water and fuel may be introduced in a liquid, gas, mist, or vapor form. According to one embodiment, adjustable valves, a control module, or other mechanism or device may be used to control the ration of water and fuel that is introduced into the chamber 704.

Nozzles that are available for sale may be used in some embodiments. For example, nozzles manufactured by Hangzhou Banry Ultrasonic Equipment Co., Ltd. Of Zhejiang, China are available for sale at banrysonic.en.alibaba.com and nozzles manufactured by Sono-Tek Corporation of Milton, N.Y. are available for sale at www.sono-tek.com. Other nozzles, for example those with frequencies similar to the oscillators of the systems 200 and 600 of FIGS. 2 and 6 may be used in some embodiments.

FIG. 7B illustrates a water polarizer 712 on the water inlet 708 and a fuel polarizer 714 on the fuel inlet 710. In one embodiment, the polarizers 712, 714 may be used to polarize water and fuel in opposite directions. This may facilitate mixing of the water and fuel as described above.

According to one embodiment, the nozzle 700 may be used as a hybrid fuel system. For example, the nozzle 700 may replace the hybrid fuel system 200 or 600 of FIGS. 2 and 6. In one embodiment, a hybrid fuel system may include two or more nozzles. For example, a single nozzle may be used for each cylinder of an internal combustion engine or a single nozzle may be used for each type of input. For example, if an a mixture of a fuel and water are used as an input a single nozzle may be used for water and another nozzle may be used for the fuel or accelerant.

Figure 8:
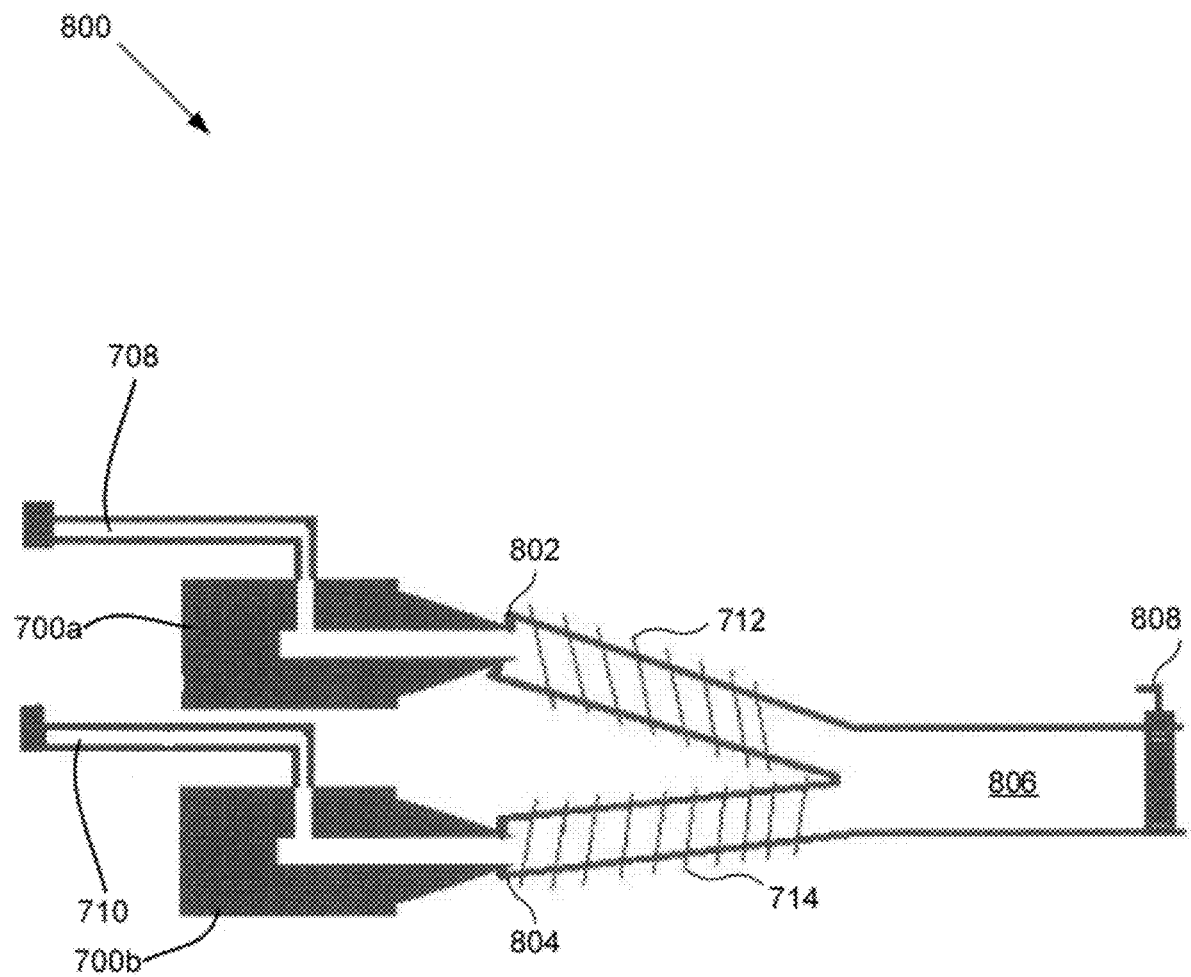
FIG. 8 illustrates one embodiment of a hybrid fuel system that utilizes two nozzles in accordance with the present invention.
Figure 10:
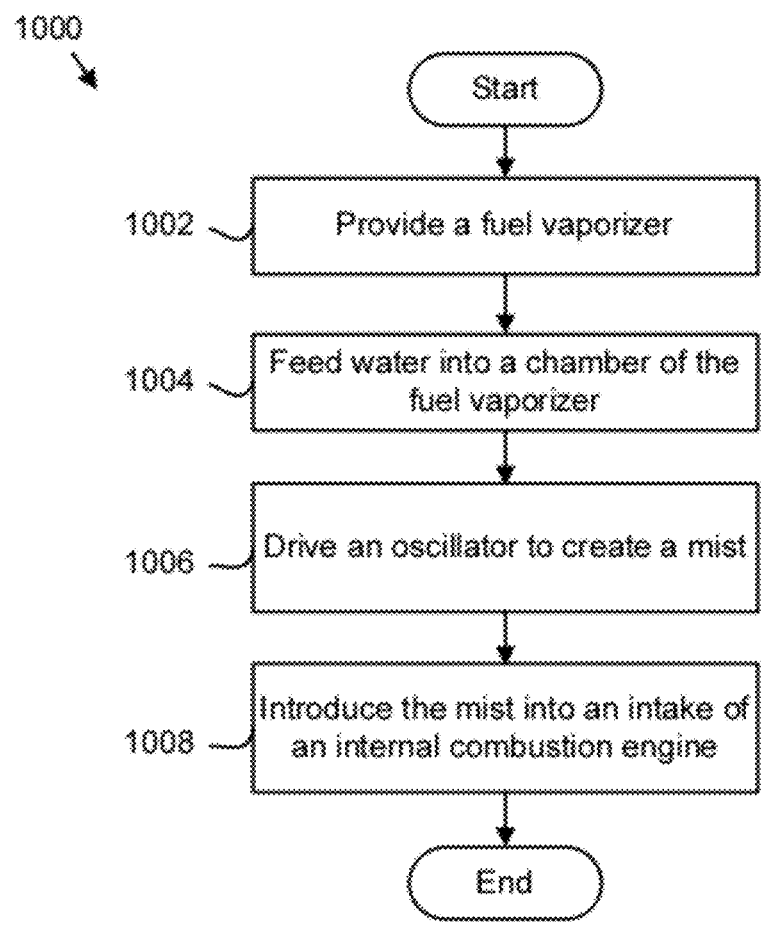
FIG. 10 illustrates another embodiment of a process for burning a water/accelerant mixture in accordance with the present invention.

FIG. 8 illustrates one embodiment of a hybrid fuel system 800 that utilizes two nozzles 700a, 700b. According to one embodiment, the nozzles 700 may operate in a manner described in relation to FIG. 7. In one embodiment, each of the nozzles 700a, 700b includes a single inlet. Nozzle 700a includes a water inlet 708 while nozzle 700b includes a fuel inlet 710. The nozzles 700a, 700b may force out a vaporized fuel/water mist into respective a water mist outlet 802 and fuel mist outlet 804. According to one embodiment, the outlets 802 include polarizers 712, 714 which may operate to oppositely polarize particles within the restrictive fuel and water mists. The polarized mists are led into a system outlet 806 which is regulated by a valve 808 which can be used to adjust the flow of the water/fuel mixture. According to one embodiment, the system outlet 806 is provided to an intake of an internal combustion engine. For example, the system outlet 806 may be in fluid communication with a carburetor or a combustion chamber.

FIG. 9 illustrates one embodiment of a process 900 for burning a water/accelerant mixture. The process begins an a mist comprising water and/or accelerant is created. The mist may be created 902 in any manner. According to one embodiment, the mist is created 902 using a piezo electric oscillator, forced air, heat or any other method. In one embodiment, the mist is created 902 using a piezo electric oscillator in a chamber.

The mist is introduced 904 into an intake of an internal combustion engine. The mist may be introduced 904 into an air intake, a carburetor, and/or a combustion chamber. In one embodiment, the mist may be mixed with additional fuel or air prior to combustion. In one embodiment, the mist may be introduced 904 directly into a combustion chamber without further addition or mixing of fuel or other components.

Combustion of the mist is triggered 906. The combustion may be triggered 906 with a spark plug in some embodiments. For example, in a four stroke gasoline engine a spark from a spark plug may be used to ignite the mixture. In some embodiments, the combustion may be triggered 906 based on compression. For example, a diesel engine may trigger 906 combustion based on compression of a combustion chamber.

According to one embodiment, the triggering 906 of combustion ignites the fuel/accelerant first. The ignition may spread through the water/mist vapor which converts and/or releases the hydrogen & oxygen gases in the water/mist vapor to become combustible gas fuels. The explosion may also create stem which rapidly expands. This process may lead to more complete combustion of the accelerant and can reduce the amount of fossil fuels necessary to run internal combustion engines to 5% or less. According to one embodiment, the inclusion of water vapor within the mixture may also lead to a low temperature burn which may reduce wear and tear on an engine.

FIG. 1000 illustrates one embodiment of a process 1000 for burning a water mixed with a fuel or accelerant. The method begins and a fuel vaporizer is provided 1002. The vaporizer may include any of the vaporizers, nozzles, hybrid fuel systems or other vaporizer or mist generators in the present disclosure. In one embodiment, the vaporizer includes a chamber for receiving a liquid, a driver module coupled with the chamber, and an oscillator disposed within the chamber and configured to be driven by the driver module. In one embodiment, the vaporizer may include a plurality of chambers.

Water is fed 1004 into at least one of the chambers. The water may be fed 1004 through an inlet such as a liquid or water inlet. According to one embodiment, an accelerant may also be fed 1004 into the chamber or into a different chamber.

An oscillator is driven 1006 to create a mist. The oscillator may include a piezo electric material driven 1006 by a driver module. For example, an electrical signal may be applied to the piezo electric material which causes the piezo electric material to oscillate. The oscillations may cause the water and any fuel to be vaporized into particles. The particles may be of any sized disclosed herein. The mist may include water and/or fuel.

The mist is introduced 1008 into an intake of an internal combustion engine. The mist may be introduced directly into a combustion chamber of an internal combustion engine or may be fed through a carburetor, air intake, or any other portion of an internal combustion engine. In one embodiment, the combustion of the mist is triggered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   providing a fuel vaporizer comprising
      a chamber for receiving liquid, the chamber comprising a water inlet, a liquid fuel inlet, an air inlet and at least one outlet,
      a driver module coupled to the chamber, and
      an oscillator disposed within the chamber and configured to be driven by the driver module;
   feeding water, liquid fuel, and air through the water inlet, fuel inlet, and air inlet, respectively, into the chamber, wherein the water gathers in a portion of the chamber by gravity and a layer of the liquid fuel floats on the water in the chamber, the oscillator being positioned in the chamber to be within the water and below the layer of the liquid fuel;
   driving the oscillator using the driver module at a predetermined frequency to create a mist from the water, liquid fuel, and air, wherein a fuel to water ratio of the mist is less than 50% fuel, wherein the mist comprises particles of water and liquid fuel that have a size between about 0.5 and 1.8 microns, individual particles comprising both water and liquid fuel; and
   introducing the mist from the chamber via an outlet of the at least one outlet into an intake of an internal combustion engine, wherein the mist is the exclusive source of combustion fuel reactants to the internal combustion engine.

2. The method of claim 1, wherein the oscillator comprises at least one oscillator disc.

3. The method of claim 1, wherein the predetermined frequency is in the range of between 0.5 and 5.0 MHz.

4. The method of claim 1, wherein the predetermined frequency is in the range of between 1.6 and 3.0 MHz.

5. The method of claim 1, wherein the fuel-to-water ratio is equal to or less than 5%.

6. The method of claim 2, wherein the fuel is at least a combination of two liquid fuels.

7. The method of claim 6, wherein at least one of the liquid fuels is a fuel additive.

8. The method of claim 6, further comprising providing a water hydrolysis device for hydrolyzing the mist, wherein the water hydrolysis device is downstream of the chamber of the fuel vaporizer, wherein the method comprises hydrolyzing the mist before introducing the mist into the intake of the internal combustion engine.

9. The method of claim 8, wherein the water hydrolysis device comprises one or more light emitting diodes that promote covalent bond breakage and thereby facilitate hydrolyzing the water molecules in the mist.

10. The method of claim 9, wherein the water inlet comprises a water polarizer and the fuel inlet comprises a fuel polarizer, wherein the method includes actuating the water polarizer and actuating the fuel polarizer to oppositely polarize the water and the fuel.

11. An apparatus for vaporizing fuel comprising:
   a chamber for receiving liquid, the chamber comprising a water inlet for receiving water, a liquid fuel inlet for receiving liquid fuel, an air inlet, and at least one outlet, wherein the water gathers in a portion of the chamber by gravity and a layer of the liquid fuel floats on the water in the chamber;
   a driver module coupled to the chamber; and
   an oscillator disposed within the chamber to be within the water and below the layer of the liquid fuel and configured to be driven by the driver module, wherein driving the oscillator using the driver module at a predetermined frequency creates a mist from the water, liquid fuel, and air, wherein a fuel to water ratio of the mist is less than 50% fuel, wherein the mist comprises particles of water and liquid fuel that have a size between about 0.5 and 1.8 microns, each particle of the particles of water and liquid fuel comprising water and liquid fuel.

12. The apparatus of claim 11, further comprising a water hydrolysis device coupled downstream of the at least one outlet of the chamber, wherein the water hydrolysis device is configure to hydrolyze water molecules in the mist.

13. The apparatus of claim 12, wherein the water hydrolysis device comprises one or more light emitting diodes that are configured to promote covalent bond breakage of the water molecules in the mist.

14. The apparatus of claim 11, wherein the water inlet comprises a water polarizer and the fuel inlet comprises a fuel polarizer, wherein the water polarizer and the fuel polarizer are configured to oppositely polarize the water and the fuel.

15. The apparatus of claim 11, wherein the ratio is equal to or less than 5%.

16. The apparatus of claim 11, wherein operably feeding water, fuel, and air through the water inlet, the fuel inlet, and the air inlet, respectively, and into the chamber is done under vacuum pressure, wherein operably, wherein driving the oscillator using the driver module at a predetermined frequency creates a mist under vacuum pressure.

17. A method comprising:
   providing a fuel vaporizer comprising
      a chamber for receiving liquid, the chamber comprising a water inlet, a liquid fuel inlet, an air inlet and at least one outlet,
      a driver module coupled to the chamber, and
      an oscillator disposed within the chamber and configured to be driven by the driver module;
   feeding water, liquid fuel, and air through the water inlet, fuel inlet, and air inlet, respectively, into the chamber, wherein the water gathers in a portion of the chamber by gravity and a layer of the liquid fuel floats on the water in the chamber, the oscillator being positioned in the chamber to be within the water and below the layer of the liquid fuel, wherein the chamber is under vacuum pressure;
   driving the oscillator using the driver module at a predetermined frequency to create a mist under vacuum pressure from the water, liquid fuel, and air, wherein a fuel to water ratio of the mist is equal to or less than 5% fuel, wherein the mist comprises particles of water and liquid fuel that have a size under 1.8 microns, each particle of the particles of water and liquid fuel comprising water and liquid fuel; and
   introducing the mist from the chamber via an outlet of the at least one outlet into an intake of an internal combustion engine, wherein the mist is the exclusive source of combustion fuel reactants to the internal combustion engine.

18. The method of claim 17, further comprising providing a water hydrolysis device for hydrolyzing the mist, wherein the water hydrolysis device is downstream of the chamber of the fuel vaporizer, wherein the method further comprises hydrolyzing water molecules in the mist before introducing the mist into the intake of the internal combustion engine.

19. The method of claim 18, wherein the water hydrolysis device comprises one or more light emitting diodes that promote covalent bond breakage and thereby facilitate hydrolyzing the water molecules in the mist.

20. The method of claim 19, wherein the water inlet comprises a water polarizer and the fuel inlet comprises a fuel polarizer, wherein the method includes actuating the water polarizer and actuating the fuel polarizer to oppositely polarize the water and the fuel.

* * * * *